(12) United States Patent
Daily et al.

(10) Patent No.: US 8,745,087 B2
(45) Date of Patent: Jun. 3, 2014

(54) SYSTEM AND METHOD FOR DEFINING AND MANIPULATING ROLES AND THE RELATIONSHIP OF ROLES TO OTHER SYSTEM ENTITIES

(75) Inventors: Kevin C. Daily, Tucson, AZ (US); Brian C. Clendenin, Tucson, AZ (US)

(73) Assignee: EKA Labs, LLC, Tucson, AZ (US)

( * ) Notice: Subject to any disclaimer, the term of this patent is extended or adjusted under 35 U.S.C. 154(b) by 792 days.

(21) Appl. No.: 11/865,515

(22) Filed: Oct. 1, 2007

(65) Prior Publication Data

US 2009/0089291 A1    Apr. 2, 2009

(51) Int. Cl.
G06F 17/30         (2006.01)

(52) U.S. Cl.
USPC .......................................................... 707/781

(58) Field of Classification Search
USPC .......................................................... 707/781
See application file for complete search history.

(56) References Cited

U.S. PATENT DOCUMENTS

| | | | |
|---|---|---|---|
| 7,185,192 B1 * | 2/2007 | Kahn | 713/155 |
| 2002/0095571 A1 * | 7/2002 | Bradee | 713/164 |
| 2002/0174333 A1 * | 11/2002 | Harrah et al. | 713/166 |
| 2005/0138411 A1 * | 6/2005 | Griffin et al. | 713/200 |
| 2005/0210409 A1 | 9/2005 | Jou | |
| 2006/0036641 A1 | 2/2006 | Brydon et al. | |
| 2006/0117390 A1 * | 6/2006 | Shrivastava et al. | 726/27 |
| 2006/0143183 A1 | 6/2006 | Goldberg et al. | |
| 2006/0190829 A1 | 8/2006 | Zaner et al. | |
| 2006/0242581 A1 | 10/2006 | Manion et al. | |
| 2007/0038594 A1 | 2/2007 | Goodwin et al. | |

FOREIGN PATENT DOCUMENTS

WO    WO2006044939    4/2006

OTHER PUBLICATIONS http://www.truthstone.com/solutions.htm; Jun. 1, 2007.
Kent Newsome; Is it Save? Kids and the New Internet; Mar. 31, 2006; http://www.newsome.org/2006/03/is-it-safe-kids-and-new-internet.shtml.
Dwight Silverman; Fasten your safety belts, kids; Apr. 2, 2006; http://blogs.chron.com/techblog/archives/2006/041 fasten_your_sathtml.
Grace Wong; Educators explore 'Second Life' Online; Nov. 14, 2006; http://www.cnn.com/2006/TECH/11/13/second.life.university/index.html.
Paul Gibler; Virtual communities make online connections; Dec. 4, 2006; http://wistechnology.com/printarticle.php?id=3530.

* cited by examiner

*Primary Examiner* — Hosain Alam
*Assistant Examiner* — Johnese Johnson
(74) *Attorney, Agent, or Firm* — Snell & Wilmer L.L.P.

(57) ABSTRACT

The capability to design and implement roles in a role-based system is disclosed. The system and data architecture enable organizations to model and assign relationships between Roles and other entities in a computing environment. The complex interrelation of Groups and Roles is established in an environment where: users need not be a member of a Group to use the capabilities of a Role; Role ownership is distinct from Role usage; and Roles themselves have attributes. A collection of methods enable creation, configuration, maintenance, ownership and usage of roles and for implementing relationships between the Role and other system entities, attributes and permissions.

23 Claims, 6 Drawing Sheets

SYSTEM AND METHOD FOR DEFINING AND MANIPULATING ROLES AND THE RELATIONSHIP OF ROLES TO OTHER SYSTEM ENTITIES

FIELD OF THE INVENTION

The invention generally relates to defining and manipulating Roles, along with the relationship of the Roles to Login-IDs and Groups in a computing environment. More particularly, the invention relates to a system and method for efficiently defining and maintaining the complex interrelation of Login-IDs, Groups and Roles in a system where users can be a member of many different Groups and where user permissions may vary depending on what Role is active for the Login-ID.

BACKGROUND OF THE INVENTION

The efficient provisioning and administration of capabilities and attributes in a system or group of systems is a significant challenge faced by many modern organizations. Modern organizations often utilize numerous computer applications, each of which typically enforce business rules, enable the processing of numerous business functions, and model multiple organizational and/or hierarchical structures. Users in the system may have different levels of access, different capabilities and different relationships to the other users and Groups in the organization depending on the particular system or module being accessed. For instance, a typical school system may have separate methods or computer applications to record information about students, organize and define classes, order supplies, track assets, plan and track curriculum, as well as a web site portal to communicate with parents and the community.

To reflect organizational reality, computer systems and automated methods enable functionality to define Groups that reflect the organization's hierarchical and/or functional grouping users in this manner, a system manages the users' attributes and capabilities centrally, at the Group level. The concept of a Group also provides increased flexibility and efficiency because the construct is usually implemented to allow Groups to be members of other Groups. A single Group is often used to combine two or more other Groups, thereby enabling organizations to model sub- or super-Groups. For instance, in a typical school organization, the science Group may include the sub-Groups biology, chemistry and physics departments, while the science Group itself may be part of a super-Group that includes all the science Groups for every school in the school district.

In addition to Groups, a Role can be used to combine one or more capabilities or attributes. Generally, a member of any organization is afforded a level of access or authority within an organization in order to perform assigned Roles, whether the Roles are trivial, administrative or authoritative in nature. A number of commercial and proprietary software tools have been developed to help organizations manage employees and employee Roles. Companies often use simple databases to record information relating to an employee for use by Human Resources, Payroll, and Management. As such, an employee is able to perform designated functions for the company in accordance with the recorded duties and responsibilities.

There is a need to separate the Group and Role entities; this allows the desired relationships to be expressed directly. Existing methods only allow Groups to own a Role. A strong need exists to allow multiple Roles to be combined to form a higher level Role, thereby adding a level of sophistication that enables more logical modeling of a real life organization. Closer modeling of the underlying organizational structure provides more efficient and intuitive configuration and ongoing maintenance of the system. Moreover, existing technology does not provide for separate ownership and usage of a Role. A need exists to increase the functionality of such systems by decoupling the ownership of (or ultimate authority over) a Role from the usage of (or ability to execute the capabilities of) a Role.

Although system design schemes allow for both Groups and Roles constructs, there is a need to provide richer functionality by increasing the flexibility of these constructs. In typical Role-based systems, one relationship, i.e. membership in the Group, is used to express two different concepts. That is, Groups are used to express both true membership and to aggregate permissions. Moreover, existing technologies only use Roles for permissions and privileges and treat Roles as attributes to be shared among a Group of users, not as a concept that can also be used to assist in characterizing properties for a single individual. There is a need to allow essentially any attribute to be captured in a Role.

The typical school organization provides a useful illustration of the Groups and Roles concept. In a school organization, the Principal may be the only person with authority to approve disciplinary actions against students. This scenario illustrates the need for more flexible use of Roles. Groups have members, Roles have users. The intent and meaning of the relationship is different for the two cases. Membership in a Group could be used to imply that a user is allowed a certain privilege, using a Role expresses that relationship explicitly. If the capabilities of a Principal as a Group and instead of being associated directly to the Principal's Login-ID, the Role would be difficult to transfer. A need exists for using a Role in this situation to allow the authority to be easily transferred to a new principal when needed or even transferred to the vice principal temporarily while the principal is on vacation.

Computing environments have modeled a limited set of societal entities, with each environment representing a small subset of the known societal entities. In one example, environments commonly referred to as "social networking" represent a single Role of a Login-ID, as well as a set of roles with a common interest, commonly called a "Group." However, these Groups cannot own Roles, nor do they typically own content of their own. Groups simply give a collection of Roles a single label for easy reference, e.g. as a member of one or more groups. In such computing environments, the content of each Group is kept separate, but is shared within the Group. However, the opportunity for interaction within the environment is extremely limited, typically only with other Group members. Therefore, there is a need for increased functionality to enable a system to recognize that societal entities are not monolithic and that there are more kinds of relationships than have previously been modeled.

SUMMARY OF THE INVENTION

The invention includes a system and method for defining and manipulating Roles, along with the relationship of the Roles to Login-IDs or Groups in a computing environment. In an exemplary embodiment, the components of the invention include a Role definition and maintenance utility, an attribute configuration and maintenance utility, a permissions evaluation module and an organizational modeling tool. The system defines a class structure for structuring the Entities of the system and representing the relationships between the Entities. This object oriented design provides maximum flexibility and enables the complex relationships of an organization to be represented in the system.

With respect to the utility for defining and maintaining Roles, an exemplary utility allows the appropriate user to create a Role, assign an owner to the Role, grant or revoke Role usage, delete a Role, delete a Role owner, change Role ownership, transfer Role ownership, change a Role attribute, activate or deactivate a Role usage, along with adding or removing a Role to a Group, a user or another Role. The program administrator may initially create a Role and define the owner. The Role owner may further define the Role and its remaining attributes and enable other Entities in the system to use the capabilities of the Role. In another embodiment, the Role owner delegates Role definition and maintenance to another user in the system and maintains approval authority over certain types of maintenance functions performed on the Role. The owner of a Role may also transfer ownership of the Role to another user in the system either permanently or temporarily.

The defined Roles enable the system to make decisions based upon the value of an attribute. A Role typically includes many attributes. An attribute may be as simple as a typical characteristic, such as a person's birth date, or as complex as a computation based upon dynamic variables. The attribute definition and evaluation utility enables the authorized user to define attributes, along with the values, functions and rules associated with each attribute. The complex organization and relationships enabled by other utilities in the system allow a user to be a member of many Groups, Roles, sub-Groups and sub-Roles. Therefore, a particular user's permission to perform a task in a system may be, for example, a function of numerous attributes from a multitude of different Roles the user is authorized to use. In this regard, the evaluation utility allows an authorized user to establish sophisticated permission evaluation methods based upon multiple inputs. Using a permission evaluation, the system resolves permission conflicts that may arise from an Entity being associated with multiple Roles. Calculations can be as simple as a comparison of the values of the input parameters, or as complex as calculating a composite attribute based upon the individual input attributes.

The organizational modeling tool models the complex relationships of real-world organizations. Even the most basic organizations have many structures that are typically defined and maintained. Examples of such structures include hierarchical structure; functional structure; reporting relationships and roll ups; and authorization and approval workflows. Each Entity within such structures may have a unique membership, system capabilities and interrelationships with other Entities. This tool leverages the flexibility afforded by the decoupling of Roles from the user and Group objects, while mitigating the complexity inherent in the abstract data model which implements Roles. The organizational modeling tool provides the responsible personnel of any organization with the ability to model, implement and maintain organizational structures and relationships.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show an exemplary embodiment by way of illustration and its best mode. While these exemplary embodiments are described in sufficient detail to enable those skilled in the art to practice the invention, it should be understood that other embodiments may be realized and that logical and process changes may be made without departing from the spirit and scope of the invention. Thus, the detailed description herein is presented for purposes of illustration only and not of limitation. Moreover, any of the functions or steps may be outsourced to, or performed by, one or more third parties. Furthermore, any reference to singular includes plural embodiments, and any reference to more than one component may include a singular embodiment.

For the sake of brevity, conventional data networking, application development and other functional aspects of the systems (and components of the individual operating components of the systems) may not be described in detail herein. Furthermore, the connecting lines shown in the various figures are intended to represent exemplary functional relationships and/or physical couplings between the various elements. It should be noted that many alternative or additional functional relationships or physical connections may be present in a practical system.

In general, the invention includes a system and method for enabling Roles to be implemented as Entities in a system, independent of Groups and users. As used herein, "Role" includes an Entity in the computing environment composed of a Role owner attribute and one or more capabilities, parameters, and/or attributes that may be applied to the representation of a user in the computing environment. The invention contemplates a Role as an Entity or object in the system that helps to decouple these characteristics from the Group and user Entities. All three of the major Entities in the system (users, Groups, and Roles) may own other Roles. The ownership of other Roles enables more flexible and powerful modeling, thereby enabling systems to more accurately reflect real-world organizations and relationships.

As used herein, the term "user" includes any individual, Group, organization, business, software and/or hardware which uses the computing environment. The term "Login-ID" includes the set of properties that are considered unique to each user. In one embodiment, Login-ID includes an instance of a user, a screen name and/or login name. The properties associated with a Login-ID consist of, in one embodiment, a unique name and a password in order to authenticate the user when the user desires access to the environment.

As used herein, the term "Group" includes an Entity in the computing environment composed of zero or more members, as well as other auxiliary information. Members may include Login-IDs, Roles or other Groups. In an exemplary embodiment, a distinction exists between control over and use of an Entity such as a Role or Group. "Control over" includes owning a system Entity (e.g. "Role owner"). "Use" of a system Entity (e.g. Group x "uses" Role y) includes the ability to control, but only to the extent allowed by the owner. In one embodiment, if allowed by the owner, usage may even include the ability to transfer control to other Login-IDs. As used herein, "attribute" includes primary attributes which may be required attributes, non-primary attributes which are not required, and custom attributes which are user defined.

Figure 1:
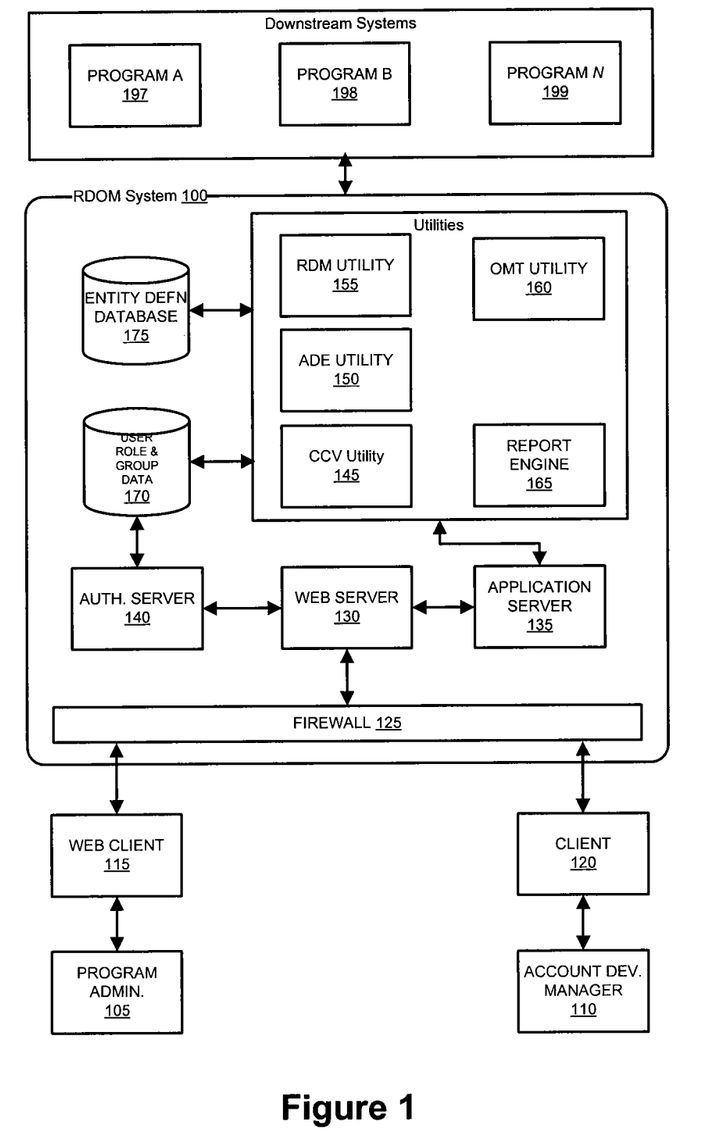
FIG. 1 is a block diagram illustrating the major system components for an exemplary Role based system, in accordance with an exemplary embodiment of the present invention.

With reference to FIG. 1, in one embodiment, the Role Definition and Organizational Modeling (RDOM) system 100 facilitates implementation of a Role based system by allowing users to connect to and use a series of utilities. Various users of the system included the program administrator (PA) 105 and Role owner (RO) 110).

Program administrator (PA) 105 includes any individual, business, government organization, other entity, software and/or hardware, which interacts with RDOM system 100. PA 105 defines and maintains Roles, Groups, and Login-IDs ("Entities"); modifies Entity attributes; defines permission evaluation functions; and/or models, implements or modifies an organizational structure. PA 105 may be, for example, an administrative employee of school who accesses RDM utility 155 to assign the hall monitor Role to a new attribute that was previously defined for the Role using the ADE utility 150. In another embodiment, PA 105 is a consultant hired by a school system who accesses OMT utility 160 to model all the organizations in the school system and establish reporting hierarchies.

Role Owner (RO) 110 is another exemplary user of the system and may include any individual, business, Entity, government organization, software and/or hardware, which interacts with RDOM system 100 to define and/or maintain Roles. RO 110 may be, for example, the secretary of a school principal who accesses RDM utility 155 to assign the hall monitor Role to a new Group of students.

The RA 105 and RO 110 access the Role definition and maintenance (RDM) utility 155, the attribute definition and evaluation (ADE) utility 150, calculate the composite value (CCV) module and the organizational modeling tool (OMT) utility 160 through, in one embodiment, a web client 115 with a network connection to a web server 130. In another embodiment, a client computer 120 may be equipped with an interfacing program to directly and/or indirectly interface with the various components of the RDOM system 100 by way of a LAN, WAN or any other known network configuration discussed herein.

The Entity Definition Database (EDD) 175 stores the definitions of all the system Entities (e.g. Login-IDs, Groups and Roles) and the relationships that exist between the system Entities. The User, Role & Group Data 170 stores the data associated with the Entities.

Web server 130 employs an authentication server 140 in order to validate and/or assign proper permissions to authorized Login-IDs in the RDOM system 100. Web server 130 also employs an application server 135 to manage various applications and utilities that are utilized by RDOM system 100. In one embodiment, RDM utility 155 is invoked by application server 135 to query the EDD 175 to retrieve the Role definition data. In one embodiment, application server 135 interfaces with a report engine 165 to create pre-configured and/or ad-hoc reports representing any data elements detailed herein.

With reference to FIG. 1, downstream systems 197-199 represent any system, application, network and/or other Entity that access the Entities defined and stored in RDOM system 100. In an exemplary embodiment, RDOM system 100 is used to define, store and/or maintain Roles, Login-IDs and Groups as objects. RDOM system 100 also passes these objects to downstream systems (e.g. upon request). For instance, a school may have one application that provides the administrative functions of the school. All of the school's departments, students, teachers, organizational hierarchies, and functional Role definitions may be defined, stored and maintained in RDOM system 100 and passed downstream to the administrative system as needed. A second downstream system may be an Internet portal that posts information about the school. RDOM system 100 may be used to model the permissions, Roles and reporting hierarchies unique to the Internet portal and pass such information (along with the student, teacher and classroom information) downstream to the Internet portal (e.g. upon request). Continuing with this illustration, still another downstream system may include a commercial social networking application that provides students of a school with a safe social networking experience. Such an application may use the existing student information in RDOM system 100, along with permission and content restriction attributes defined by the student's parents, as input to the functions provided in the social network.

Important relationships exist between the classes in the RDOM system 100, as well as between some of the relevant attributes of the classes. In an exemplary embodiment, the architectural design that governs these relationships is depicted in the class diagram of FIG. 2. Any or all of the classes may, in addition to those attributes illustrated in FIG. 2, contain other attributes, operations, or properties. For example, no ownership is indicated for Login-ID 220 and Group 225 classes. While these relationships are important, the relationships are not required for the intended focus on the Role object presented. In another embodiment, optimizing the implementation may include adding other classes or altering the method of defining the associations.

Figure 2:
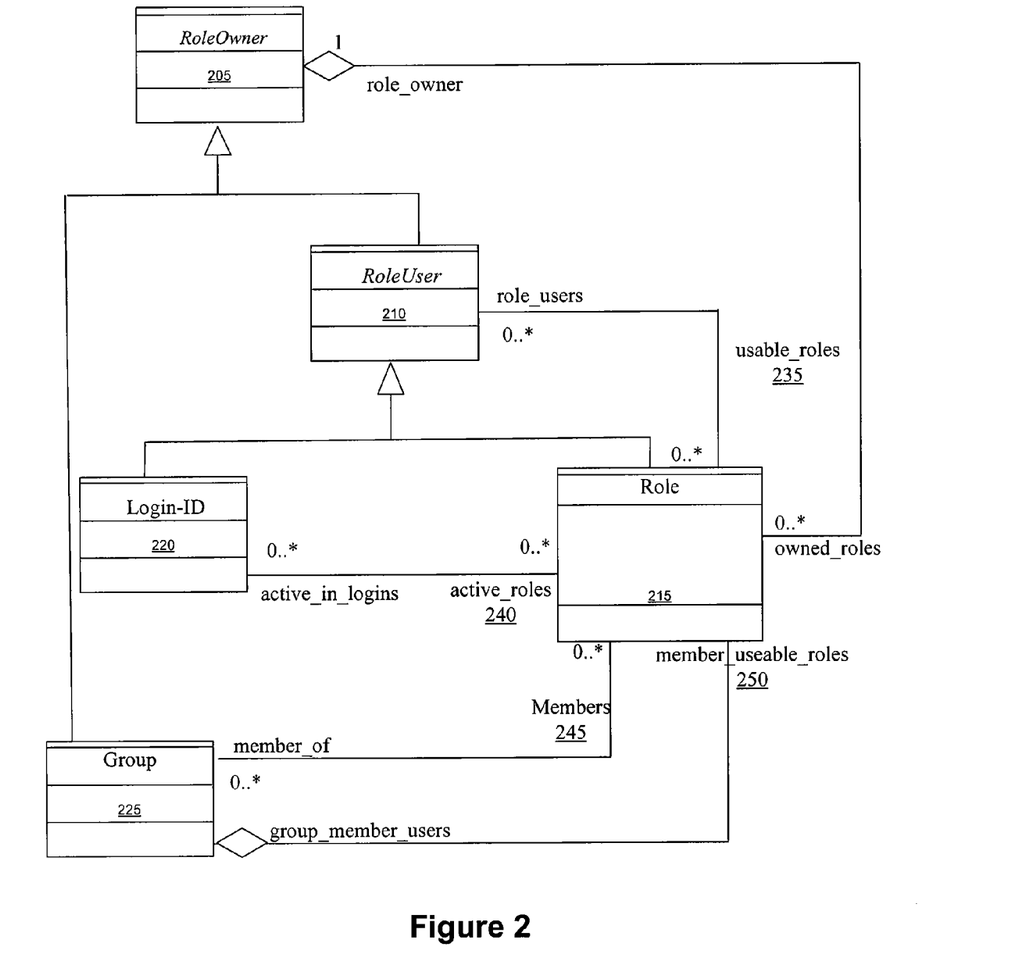
FIG. 2 is a diagram showing an exemplary class structure for facilitating Roles in a system, in accordance with an exemplary embodiment of the present invention.

The RoleOwner class 205 is an abstract class with the purpose of maintaining which Roles are owned by each instantiated object with a type of a concrete class derived from the RoleOwner class 205. In an exemplary embodiment, RoleOwner 205 defines one association named owned_Roles 230. This association enumerates the Roles which are owned by this object. Each RoleOwner 205 object may own any number of Role 215 objects. In certain embodiments, the number may be limited. Because the owned_Roles association 230 is an aggregation, if the RoleOwner 205 object is deleted, then any Roles 215 enumerated in the owned_Roles association 230 is deleted as well.

The RoleUser class 210 is another abstract class, with the purpose of maintaining which Roles are currently usable. Because this class inherits from the RoleOwner 205, it also owns Roles 215, but this ownership is for architectural flexibility and not mandatory in all embodiments. The list of Roles that are used is maintained in an association that is called usable_Roles 235. This association enumerates each Role 230 that the RoleUser 210 object is directly permitted to access for the purpose of using the attributes and permissions of the Role. However, as the Role class 215 is derived from RoleUser 210, a Role object may itself use other Roles. Such other Roles are collected when determining the complete list of Roles 215 of which a RoleUser 210 may access. Each RoleUser 210 object may access any number of Role objects in this manner. In this embodiment, the Role 215 objects enumerated in the usable_Roles association 235 need not be owned by the RoleUser (i.e. they need not be present in the owned_Role association 230).

The Login-ID class 220 is the collection of properties used to identify each unique user of the computing environment. Traditionally, this class would have a number of attributes describing the user. However, in this embodiment, very few attributes remain in the Login-ID class 220. Typically, the remaining attributes include a log in name, a password, and associated Roles 215. These associated Roles 215 now contain essentially all of the attributes that the Login-ID 220 would traditionally have contained directly. Because the class is derived from the RoleOwner 205 class, a Login-ID object 220 can own Roles 215. In other embodiments, implementing this method will often result in the Login-ID 220 class defining a third association, called active_Roles 240. The Role 215 objects listed in this association are a subset of the Role 215 objects that are usable by the Login-ID 220 object, and are the Roles that are actually used to determine the composite attribute values for the Login-ID 220 object. Other embodiments could combine this association with the usable_Roles association 235, using a flag in the association to denote whether or not the Role is active. One reason a user may wish to deactivate a Role is because that Role may contain very broad powers and deactivating that Role ensures that the powers are not exercised by mistake.

In an exemplary embodiment of class structures, a Group 225 is a collection of Roles 215 and the Roles 215 that comprise the Group 225 are recorded in the association named members 245. Since the Group 225 is derived from RoleOwner 205, Groups can own Roles 215. The Group class 225 may also define another association with Role 215, namely member_usable_Role 250. In an exemplary embodiment, the association records the Role 215 object that is automatically usable to Login-IDs 220 with an active Role 215 that is a Group 215 member. Role 215 cannot be deleted, although it may be edited. Because the member_usable_Role association 250 uses aggregation, when the Group is deleted, the Role defined for that association is also deleted. In another embodiment, this association could also be handled by defining the conditions under which any Group-owned Role is added to a Login-ID. In another embodiment, a simple variation exists whereby a variable number of Roles may be associated with the Group in this manner.

As used herein, the term "network" includes any electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g. Palm Pilot®, Blackberry®), cellular phone, kiosk, etc.), online communications, satellite communications, off-line communications, wireless communications, transponder communications, local area network (LAN), wide area network (WAN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

In addition to the components described above, the RDOM system 100 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: Role, User & Group Data 170 and EDD 175 both internal and external to the RDOM system useful in the operation of the invention as disclosed.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g. Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein. In one embodiment, RDM utility 155, or any other RDOM system 100 component, may interact with any number of additional computing systems and databases in order to facilitate, for example, program administration, Role definition and maintenance, permission definition, reporting and the like. Computing systems and databases residing outside of RDOM system 100 may be administered by an authorized user and/or product provider or any other third party Entity directly or indirectly involved in facilitating the disclosed system. Such third party Entities may include program administrators, corporate officers, management consultants, IT support personnel, and the like.

As will be appreciated by one of ordinary skill in the art, the invention may be embodied as a customization of an existing system, an add-on product, upgraded software, a standalone system (e.g. kiosk), a distributed system, a method, a data processing system, a device for data processing, and/or a computer program product. Accordingly, the invention may take the form of an entirely software embodiment or an embodiment combining aspects of both software and hardware. Furthermore, the invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

In one embodiment, RDOM system 100 may provide limited or restricted access for certain users or Groups, such as, for example, clients, employees, or any other third party with an interest in, for example, viewing organizational structure, defining new Roles, viewing reports, and the like. PA 105 and RO 110 may interface with RDOM system 100 via any communications protocol, device or method discussed herein or known in the art. In one embodiment, PA 105 and RO 110 may interact with the invention via an Internet browser at a web client 115 and/or wireless device. In another embodiment, PA 105 and RO 110 may interact with the invention by way of client PC 120 with a LAN connection to the various components of RDOM system 100.

Web client 115 comprises any hardware and/or software suitably configured to facilitate input, receipt and/or review of any information related to RDOM system 100 or any information discussed herein. Web client 115 may include a browser application installed on any device (e.g. personal computer), which communicates (in any manner discussed herein) with the invention via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 115 may or may not be in direct contact with the RDOM system 100. For example, web client 115 may access the services of the RDOM system 100 through another server, which may have a direct or indirect connection to web server 130.

As those skilled in the art will appreciate, web client 115 may include an operating system (e.g. WINDOWS NT, 95/98/2000/Vista, OS2, UNIX, LINUX, SOLARIS, MAC OS, etc.) as well as various conventional support software and drivers typically associated with computers. Web client 115 may include any suitable personal computer, network computer, workstation, minicomputer, mainframe or the like. Web client 115 can be in a home or business environment with access to a network. In an exemplary embodiment, access is through a network or the Internet through a commercially available web-browser software package. Furthermore, web client 115 may be independently, separately or collectively suitably coupled to the network via data links which includes, for example, a connection to an Internet Service Provider (ISP) as is typically used in connection with standard modem communication, cable modem, Dish networks, ISDN, Digital Subscriber Line (DSL), or various wireless communication methods, see, e.g. Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The invention contemplates uses in association with web services, utility computing, pervasive and individualized computing, security and identity solutions, autonomic computing, commodity computing, mobility and wireless solutions, open source, service oriented architecture, biometrics, grid computing and/or mesh computing.

Web server 130 may include any hardware and/or software suitably configured to facilitate communications between web client 115 and one or more RDOM system 100 components. Further, web server 130 may be configured to transmit data to web client 115 within markup language documents. Web server 130 may operate as a single Entity in a single geographic location or as separate computing components located together or in separate geographic locations. Requests originating from web client 115 may pass through a firewall 125 before being received and processed at web server 130. As used herein, "transmit" may include sending electronic data from one system component to another over a network connection. Additionally, as used herein, "data" may include encompassing information such as commands, queries, files, data for storage, and the like in digital or any other form. Web server 130 may provide a suitable web site or other Internet-based graphical user interface which is accessible by PA 105 and RO 110 or any other authorized third party. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that may be used to interact with the user. For example, a typical web site may include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (e.g. http://yahoo.com/stockquotes/ge) and an IP address (e.g. 123.56.789.98). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g. Alex Nghiem, IT Web Services: A Roadmap For The Enterprise (2003), hereby incorporated by reference.

In one embodiment, firewall 125 comprises any hardware and/or software suitably configured to protect RDOM system 100 components from users of other networks. Firewall 125 may reside in varying configurations including Stateful Inspection, Proxy based and Packet Filtering among others. Firewall 125 may be integrated as software within web server 130, any other system component or may reside within another computing device or may take the form of a standalone hardware component.

In one embodiment, application server 135 includes any hardware and/or software suitably configured to serve applications and data to a connected web client 115 and client 120. Like web server 130, applications server 135 may communicate with any number of other servers, databases and/or components through any means discussed herein or known in the art. Further, application server 135 may serve as a conduit between web client 115 and RDM utility 155, ADE utility 150 and CCV utility 145. Web server 130 may interface with application server 135 through any means discussed herein or known in the art including a LAN/WAN, for example. Application server 135 may further directly and or indirectly interact with authentication server 140, or any other RDOM system 100 component in response to web client 115, or any other system or sub-system, requests.

RDOM system 100 further includes a report engine 165. Report engine 165 includes any hardware and/or software suitably configured to produce reports from information stored in one or more databases. Report engines are commercially available and known in the art. Report engine 165 provides, for example, printed reports, web access to reports, graphs, real-time information, raw data, batch information and/or the like. Report engine 165 may be implemented through commercially available hardware and/or software, through custom hardware and/or software components, or through a combination thereof. Further, report engine 165 may reside as a standalone system within RDOM system 100 or as a component of web server 130.

To control access to web server 130 or any other component of the invention, web server 130 may invoke authentication server 140 in response to submission of authentication credentials received at web server 130. In one embodiment, authentication server 140 includes any hardware and/or software suitably configured to receive authentication credentials, encrypt and decrypt credentials, authenticate credentials, and/or grant access rights according to pre-defined privileges attached to the credentials. Authentication server 140 may grant varying degrees of application and data level access based on Login-ID attribute values stored within Role, User & Group Data 170.

In one embodiment, the various databases disclosed herein (e.g. EDD database 175 and Role, User & Group Data 170) include any hardware and/or software suitably configured to facilitate storing authentication and/or privilege information relating to Login-IDs. One skilled in the art will appreciate that the invention may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g. paged memory, least recently used, etc.). By using BLOB methods, the ability to store various data sets that have different formats facilitates the storage of data associated with the invention by multiple and unrelated owners of the data sets. For example, a first data set which may be stored, may be provided by a first party, a second data set which may be stored, may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the invention, the data can be stored without regard to a common format. However, in one exemplary embodiment of the invention, the data set (e.g. BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g. LOADED, INITIALIZED, READY, BLOCKED, REMOVABLE, or DELETED.

The data set annotation may also be used for other types of status information as well as various other purposes. For example, the data set annotation may include security information establishing access levels. The access levels may, for example, be configured to permit only certain individuals, levels of employees, companies, or other Entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various Entities to access a data set with various permission levels as appropriate.

The data, including the header or trailer, may be received by a standalone interaction device configured to create, update, delete or augment the data in accordance with the header or trailer. As such, in one embodiment, the header or trailer is not stored on the transaction device along with the associated issuer-owned data but instead the appropriate action may be taken by providing to the transaction instrument user at the standalone device, the appropriate option for the action to be taken. The invention may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the invention may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, the invention may employ various integrated circuit components, e.g. memory elements, processing elements, logic elements, look-up tables, and the like, which may carry out a variety of functions under the control of one or more microprocessors or other control devices. Similarly, the software elements of the invention may be implemented with any programming or scripting language such as C, C++, JAVA, COBOL, assembler, PERL, Visual Basic, SQL Stored Procedures, extensible markup language (XML), with the various algorithms being implemented with any combination of data structures, objects, processes, routines or other programming elements. Further, it should be noted that the invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The software elements of the present invention may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise any number of configurations including the use of windows, web pages, web forms, popup windows, prompts, text messages, and the like. It should be further appreciated that the multiple steps as illustrated and described may be combined into single web pages and/or interfaces but have been expanded for the sake of simplicity. In other cases, steps illustrated and described as single process steps may be separated into multiple web pages and/or interfaces but have been combined for simplicity.

Referring now to the figures, the block system diagrams and process flow diagrams represent mere embodiments of the invention and are not intended to limit the scope of the invention as described herein. A practitioner will appreciate that the steps as described below may be accomplished through any number of process steps and methods producing similar results. For example, the steps recited in FIGS. 3-5 may be executed in any order and are not limited to the order presented. It will be appreciated that the following description makes appropriate references not only to the steps depicted in FIGS. 3-5 but also to the various system components as described above with reference to FIGS. 1 and 2.

Figure 3A:
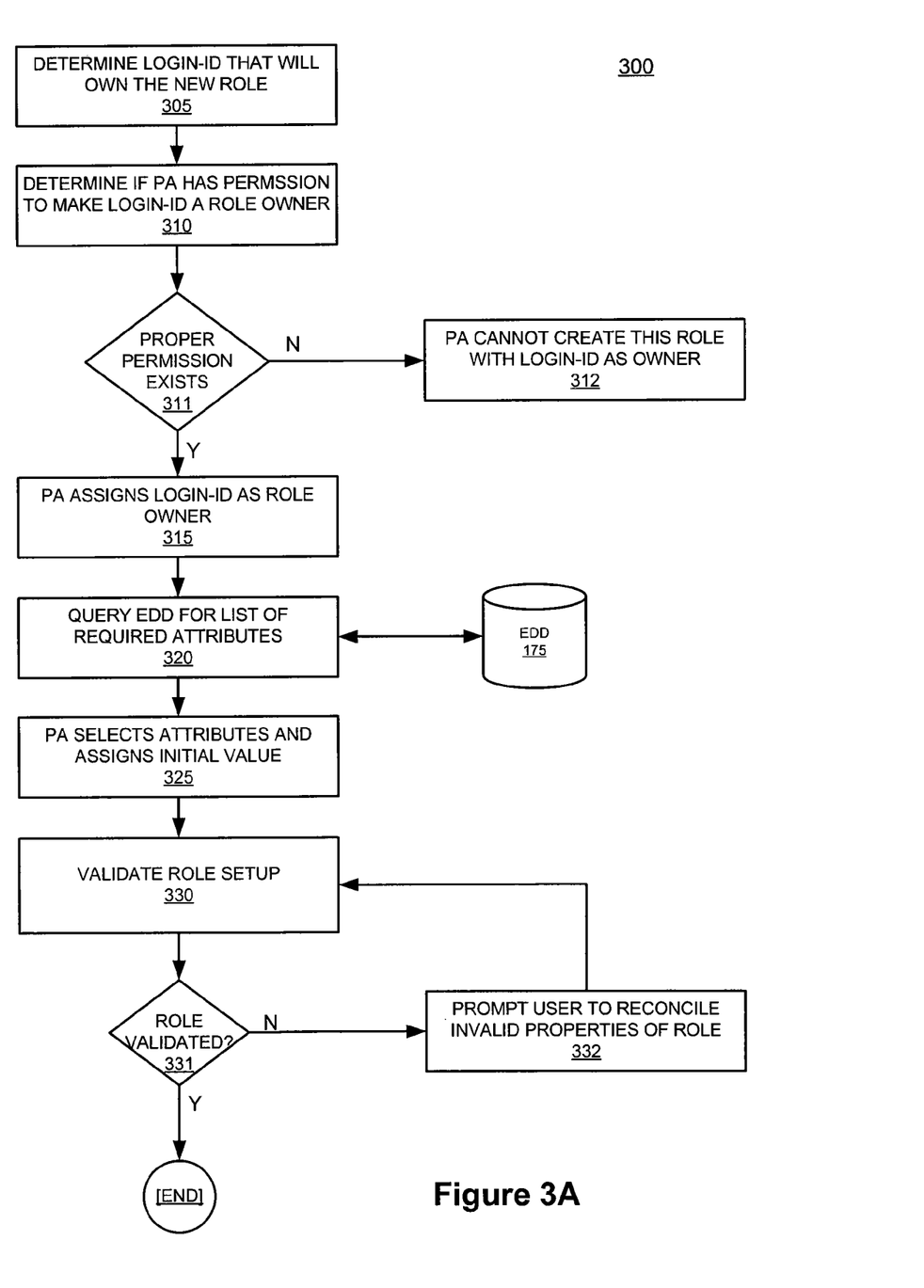
FIG. 3A is a process flow diagram showing an exemplary process for creating a Role, in accordance with an exemplary embodiment of the present invention.

FIG. 3A depicts an exemplary embodiment of a method for creating a Role (300). In one embodiment, the PA 105 determines which Login-ID is to be assigned as the RoleOwner (step 305). The RDM utility 155 determines whether the PA's Login-ID has permission to create a new Role for the chosen RoleOwner (step 310). If the proper permission exists, the PA 105 assigns RO 110 as the RoleOwner (step 315). The RDM utility 155 queries the EDD 175 and presents the PA 105 with a list of attributes that are assigned to a Role (step 320). However, in other embodiments, this query may result in a list of both mandatory and optional attributes. The PA 105 specifies other attributes that are desired for the Role, if any. If a value is desired for the attribute, the PA 105 specifies an initial value for each attribute (Step 325). The utility validates the Role setup to ensure that no (or a limited number of) system or user defined rules have been violated (step 330). The Role is created in the RDOM system 100 by saving the Role definition to the EDD 175 (step 335).

Figure 3B:
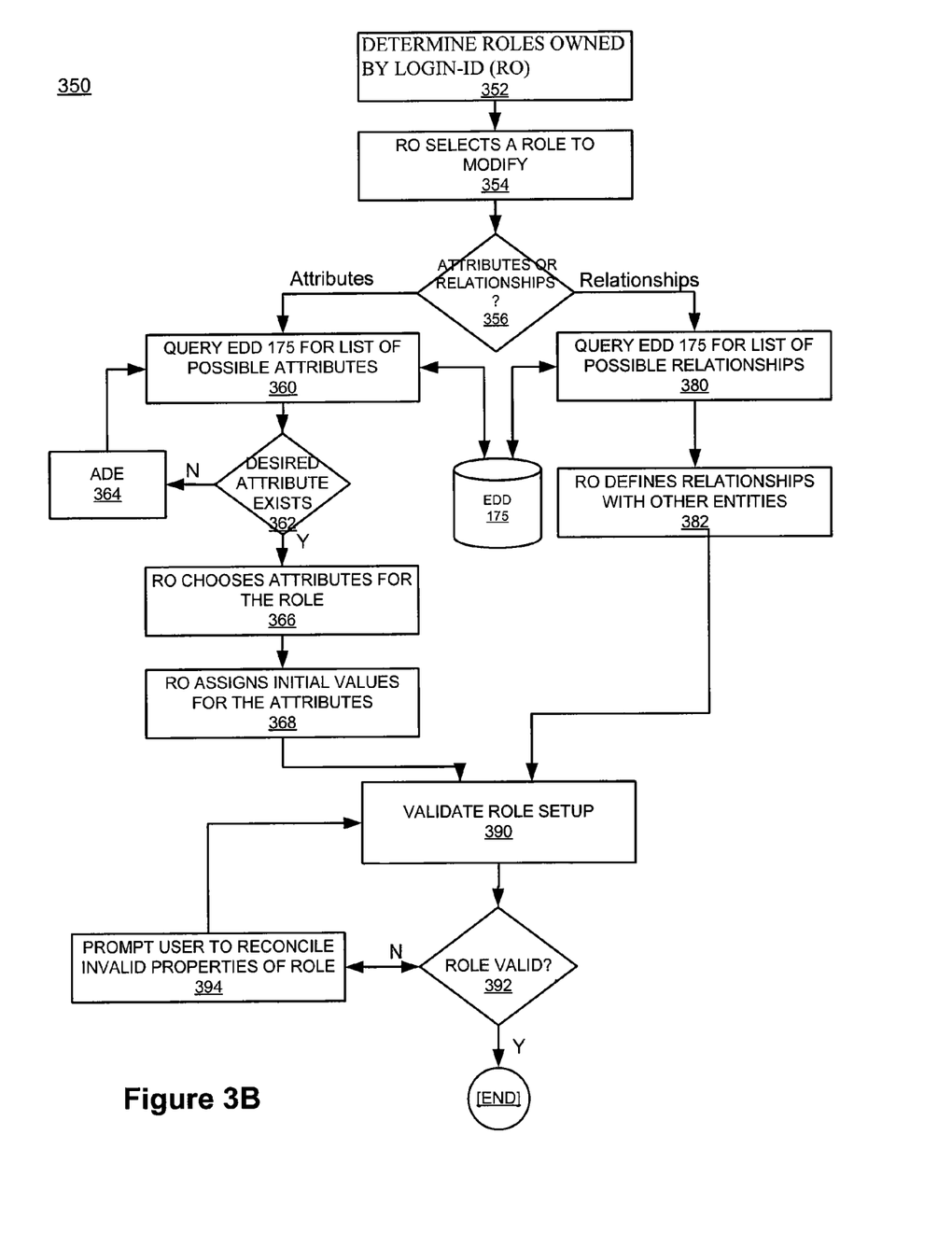
FIG. 3B is a process flow diagram showing an exemplary process for defining Role attributes, permissions and relationships, in accordance with an exemplary embodiment of the present invention.

FIG. 3B depicts one embodiment of a method (350) by which a RO 110 defines attributes, permissions and relationships for a Role. The RDM utility 155 determines the Roles for which Login-ID is specified as a RoleOwner (step 352). The RO then selects a Role to modify (step 354). The RO 110 indicates whether to modify the Role's attributes or the Role's relationships (step 356). If the RO 100 chooses to modify attributes, the RDM utility 155 queries the EDD 175 and presents the RO 110 with a list of attributes that are assigned to a Role (step 360). In one embodiment, this query returns a list of all possible attributes in the system. In other embodiments, preexisting relationships and rules may restrict the attributes that are assigned for a given Role. If the desired attributes do not exist, in this exemplary embodiment, the RO uses the ADE utility 150 to define new attributes (step 364). The RO 110 selects the desired set of attributes for that Role (step 366).

The RO 110 enters initial values for the attributes that were defined for the Role (step 368). In some embodiments, default values for attributes may be assigned by the system or may remain null. Some attribute values represent permissions and are used as input to the CCV utility 145. In another embodiment, for attributes that represent input values to the CCV utility 145, the RDM utility 155 presents the RO 110 with lookup table data so that the RO 110 ascertains the proper attribute value for the permission.

The RO 110 specifies the relationships (step 356) between the Role selected (step 354) and other Entities in this system or any other system that interfaces with it. In an exemplary embodiment, the ADE utility 150 queries the EDD 175 and presents the existing Role ownership, membership, relationships and attributes (step 380). In this step, the utility also presents to the RO 110 a list of possible relationships that can be established between the Role and those other Entities (i.e. Login-IDs, Roles and Groups). The RO 110 defines relationships, if any, with the other Entities (step 382). In an exemplary embodiment, the RDM utility 155 allows the appropriate user to change the Role owner, transfer Role ownership, grant or revoke Role usage to another Role (i.e. create sub-Role), grant or revoke Role usage to a Login-ID and to activate or deactivate a Role usage.

The separation of Role ownership from Role usage is an important feature. In an exemplary embodiment, the RO 110 associates an individual Login-ID or a set of Login-IDs with a Role and organizes Roles into Groups of Roles (step 382). If the RO 110 wishes for all the capabilities of one Role to be available in another Role, the RO 110 can choose to associate a Role with another Role. For instance, all of the members of a school's staff may be assigned the Role "Staff" and only a subset of the staff may be allowed to use the capabilities of the Role "Teacher." In this scenario, the RO 110 associates the Role "Staff" with "Teacher" so that all teachers have the basic systems capabilities of a staff member, but not all staff have the capabilities of a teacher. Similarly, depending on how the system owners wish to organize capabilities, a RO can also allow an individual Login-ID 220 to use a Role 215.

Another useful feature is the ability to activate or deactivate a Role 215. In one embodiment, the capability for multiple Roles allows disabling of a single Role 215 (by the Login-ID or by the RO), while remaining logged in with the remaining Roles. One reason a user may wish to deactivate a Role is because that Role may contain very broad powers. As such, deactivating that Role ensures that the powers are not exercised by mistake. In another embodiment, Role ownership is also transferred temporarily, e.g. for a limited time.

The RDM utility 155 validates the Role definition to ensure that no system or user defined rules have been violated (step 390). In an exemplary embodiment, if the Role is invalid (step 392), RO 110 is prompted to resolve any invalid attributes, attribute values or relationships (step 394).

In addition to properly defining and configuring Roles 215, defining the characteristics, capabilities and limitations of any attribute is central to leveraging the utility and efficiency of the invention. Attributes represent almost anything of interest to an Entity in a system such as, for example, the birth date of a user, the mailing address of a department, and/or a flag to indicate whether a student is eligible for financial aid. The attribute most central to a Role-based system is a permission. Defining permissions facilitates the security of the computing environment. Role attribute composite values are easily used to determine a permission for a given Role. In one embodiment a composite attribute value is evaluated as a Boolean value and is used to determine a permission. For example, a value that evaluates to True implies that the permission is granted, and any other value implies that the permission is denied. In another embodiment, a permission may also be implemented as a list of potential actions or a list of Entities to act upon. If the desired combination of Entity and action is present in the composite attribute, permission is granted; otherwise, permission is denied.

Figure 4A:
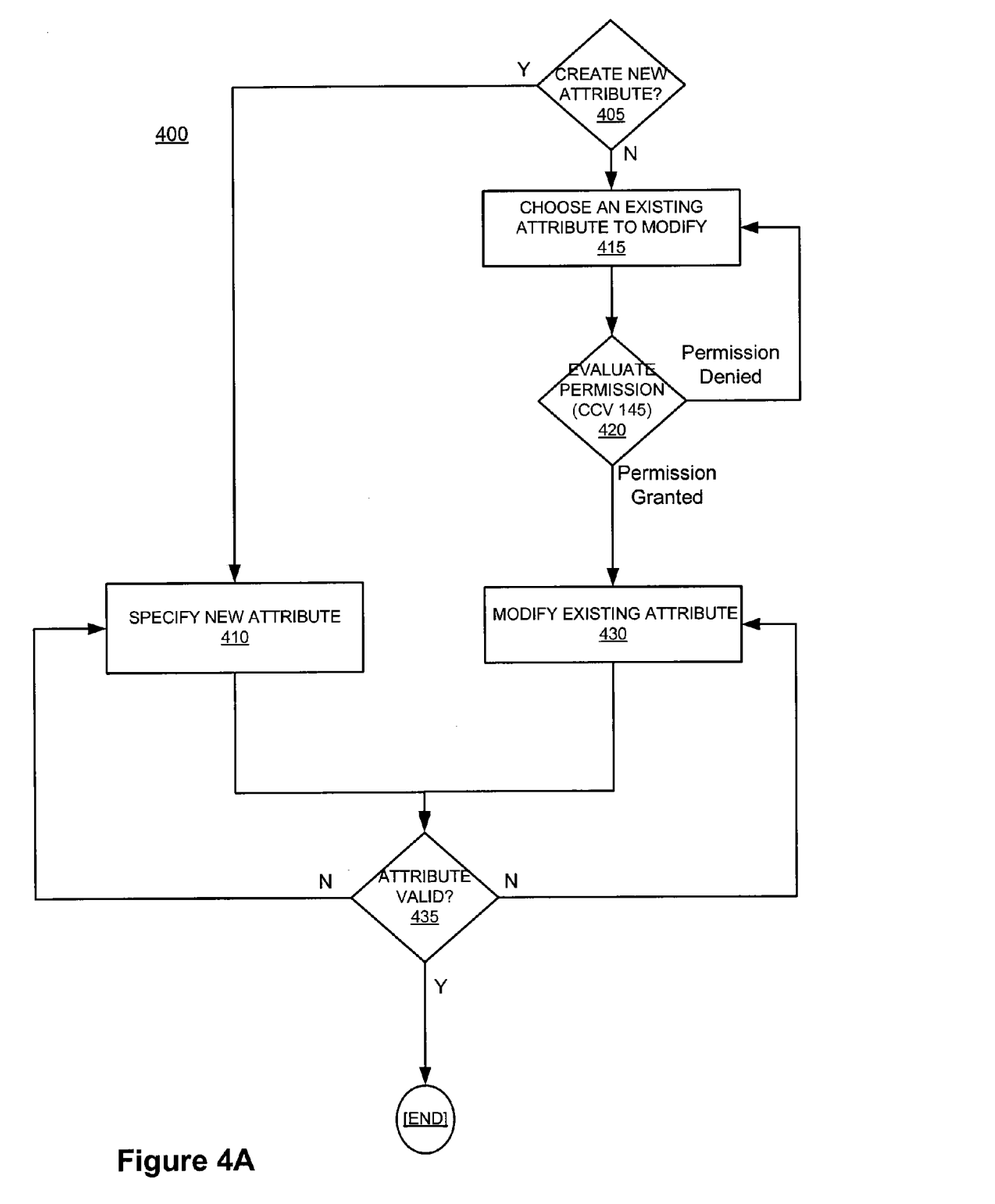
FIGS. 4A-4B are process flow diagrams showing exemplary processes for defining attributes and evaluating the composite value of an attribute, in accordance with an exemplary embodiment of the present invention.

FIG. 4A depicts a method (400) for defining attributes in a role-based system. In an exemplary embodiment, the ADE utility 150 allows PA 105 to choose whether to create a new attribute or modify an existing attribute (step 405). If the PA 105 chooses to create a new attribute, the user specifies the characteristics of the new attribute. In another embodiment, the user can be presented with a template based upon existing system attributes in order to aid in the new attribute creation process. If PA 105 chooses to modify an existing attribute (step 405), the ADE utility 150 prompts the user with an existing list of attributes to choose for modification. The ADE utility 150 sends the chosen attribute and the Login-ID to the CCV utility 145 (step 420) to determine whether the Login-ID has permission to modify the attribute. If the PA 105 Login-ID is not permitted to modify the attribute, PA 105 is returned to the beginning of the process (step 405). If PA 105 is permitted to modify the attribute, then the PA 105 makes the desired modifications (step 425). In an exemplary embodiment, a newly created or recently modified attribute is validated by the ADE utility 150 to ensure consistency with other system Entities.

Figure 4B:
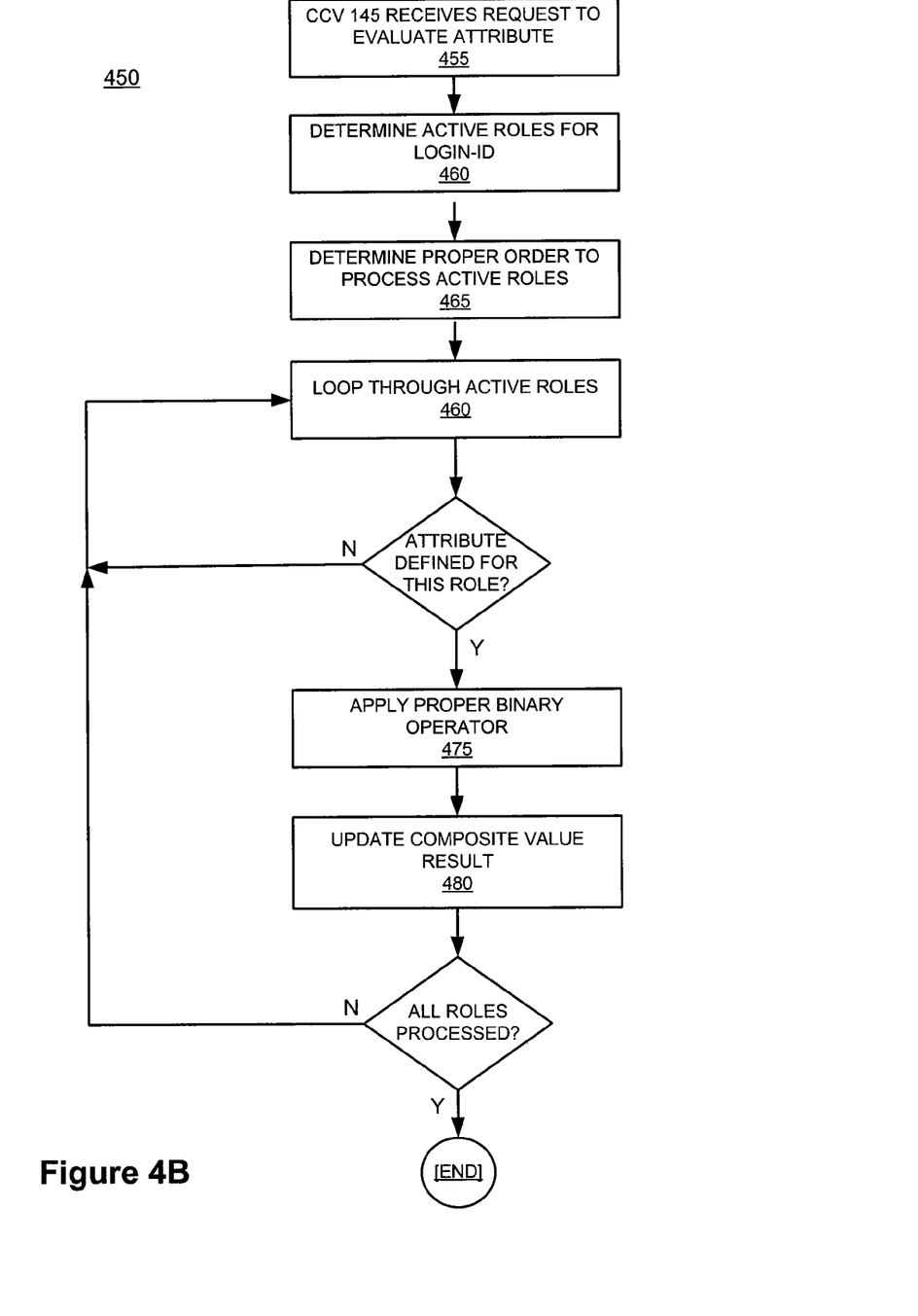

A Login-ID 220 may have multiple active Roles 240, and each Role 215 may have a different value for the same attribute. Therefore, in order for the system to make use of the attribute (e.g. to evaluate a permission), a value conflict resolution method is needed. FIG. 4B presents an exemplary method (450) for calculating a composite value of an attribute. The CCV utility 145 receives a request by the system to evaluate a particular characteristic of a Login-ID (step 455). As long as the active list of Roles has been determined, the composite value for the Login-ID's attribute may be computed at any time, depending on the particular needs of the requesting application. In one embodiment, it may be computed as soon as the active list of Roles has been determined. In another embodiment, determining the composite value of an attribute may be deferred to as late as the moment that the composite value of the Login's attribute is needed.

The CCV utility 145 retrieves all of the active Roles for the Login-ID. As shown in FIG. 4B, the CCV utility 145 queries the Role, User & Group Data 170 to determine the active Roles for the Login-ID (step 460). The CCV utility 145 reads the EDD database 175 to determine the proper order to process the Roles when constructing a composite value for this particular attribute (step 465). During this step, the module also retrieves the proper binary operand to use during the concatenation process. Depending on the nature and function of the attribute under evaluation, the binary operator may be concatenation, Boolean, or any other binary operator. In an exemplary embodiment, since the results of many of these operations may vary depending on the order that the active Roles are processed, determining the proper order to process the Ordering Roles Process (step 465) is an important step.

In an exemplary embodiment, the method generates a composite attribute value by applying a binary operator, as many times as needed, to the value of the Role's attribute or to the output of a previous operator application. Concatenation is a binary operator which can be used for lists or text. Many Boolean logical operators (logical OR, logical AND, logical EXCLUSIVE-OR, for example) are also usable binary operators for Boolean logical values. In an exemplary embodiment, the CCV utility 145 loops through (step 470) each of the Login-ID's active Roles. The CCV utility 145 applies the proper binary operator (step 475) and the system updates the composite value result and moves to the next attribute (step 480). When the proper attribute for all active Roles have been processed in this manner, the resultant composite value is returned as output (step 485). In other embodiments, a similar algorithm may be used for operators using a fixed number of operands greater than one. An operator that can be used with any number of operands and returns a single value can be used to compute the composite attribute value. This type of operator may compute the composite attribute value by returning one of the operands as the output. In another embodiment, the operator returns no valid attribute, unless all operands are the same, in which case the matching value is returned as the output.

The flexibility provided by the architecture and method embodiments discussed above enables a system to recognize that societal entities are not monolithic and that there are more kinds of relationships than have previously been modeled. In FIG. 1, this modeling capability is represented by the OMT utility 160. In one exemplary embodiment, there are two societal Entities modeled: individual people (Login-ID entity) and Groups of Roles. Both types of Entities may own multiple Roles. In this context, owning implies that the Entity has ultimate control over a Role. For Group Entities, this control is expressed by one or more Roles that are empowered to act as administrators. Groups may also own other Groups, representing sub-Groups of the parent Group Entity. Login-IDs may assume multiple Roles, and Groups may have multiple sub-Groups. Any Group may own individual Roles. The owner of each Role defines the capabilities of the Role with respect to the content owned by the same Entity, as well as the allowable interactions with other Roles. An individual person may own a Group, which can be used to represent a sole proprietorship. In another embodiment, an individual person may be owned by another individual person such that it represents the relationship between a legal guardian and a minor. A Group may own another Group, which may represent an office location within a company. A Group may also own an individual person, a capability that may be used by the system to maintain ultimate ownership over all of its users. Of course, an individual person or a Group may also not be owned at all such that they represent independent Entities from the point of view of the computing environment.

In one embodiment, any Entity (whether individual or Group) has at least one associated Role. The Entity may or may not own the Role, but the Role has sufficient privileges to create a new Role for that Entity. When the Entity is created, the associated Role is defined or created, as needed. At the time of creation, the Entity also defines the rules for changing the permissions of the Roles it owns or administrates, as well as the relationships that those Roles (or the Entity itself) may establish with other Roles. Another set of rules defines how to change the rules in that any permission, relationship, and/or rule may be changed by meeting the criteria set forth in the relevant rule(s). This technique may be used to change the Roles that have administrative privileges for the Entity in question.

Not only does the organizational modeling capability allow for rich, flexible associations between Login-IDs, Groups and Roles, but it also allows for associations with content and other data. In one embodiment, any Entity or Role may own any type of content provided for by the computing environment, as allowed by the Role's or Entity's owner(s) or administrators. Restrictions may also be enacted by the computing environment's owners. Also, each Role and/or Entity may enter into any relationship supported by the computing environment, as allowed by the owner(s) and administrators of the Entity or Role. Content types may include, for example, HTML, XML, blogs, diaries, journals, messages, still images, video images, sound data, data contained in discrete files, and/or links to other computing environments. The types of relationships include, for example, being a Group member, sending/receiving messages (e.g. email, instant message, chat), displaying content, sharing content, and/or interactions in a shared space.

Because a Role is more focused than a Group, it is much easier to manipulate and therefore easier to create a new Role with a subset of the capability of the original Role (e.g. in order to transfer that subset to a new user). This simplicity and focus enables people to do these kinds of operations without special training. Roles also simplify access to resources between unrelated owners. The multiple Roles functionality enabled by the class relationships detailed herein allows a person to group their responsibilities, content and/or privileges. Roles can also use other Roles, allowing even more organizational possibilities. In existing implementations, manipulating groups from multiple unrelated owners is quite awkward, because each Group can have multiple members, yet the Role can be easily targeted as narrowly as desired. Furthermore, because the Role is separate from the Login-ID and the Group, neither the Login-ID nor the Group need be present to validate access to the resources. This increases the security of the system by minimizing the visibility that the authenticating party has into the system. Prior art systems have a much harder time offering users and groups a comparable level of protection.

A Role may be modeled for the specific capabilities of an individual user function. In that regard, the Role may have characteristics that have no meaning for a Group. For example, it would be very contrived to define the powers or characteristics of a Treasurer as a Group, yet one may want to temporarily or permanently share a Treasurer Role among separate users. As another example, with regard to a character in an online game, it would be very difficult to define the characteristics for "Merlin, a 10th level Wizard" as a Group entity without severely abusing the concept of a Group. On the other hand, a "Merlin" Role could clearly be defined and used by any appropriate user.

An exemplary and useful business approach for implementing the inventions discussed herein is leveraging it for use in a school system. School systems have a need for easy, effective and cost efficient means to organize and share information about their enterprise. Furthermore, a recognized demand exists for a social network that provides social networking functionality, but also provides for parental oversight and an increased level of privacy and security for young users. Given these needs, a service provider, a school system and the community could form a mutually beneficial partnership. The service provider could provide low-cost enterprise services to help organize and share school related information among parents, teachers, students and the school. Parents and students would be represented as entities in this system. As such, parents and students are now included in the system such that the system can then be used to implement a social networking environment for children. The system may include participation and oversight by parents. This business approach has the potential to meet the needs of business, schools, parents and children.

While the steps outlined in the above description represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to 'at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

We claim:

1. A computer-based method comprising:
    creating, by a computer for implementing a role-based system, a Login-ID within a data structure;
    creating, by said computer, a first role and a second role within said data structure;
    receiving, by said computer and from a requestor, a request to assign said first role to said Login-ID;
    assigning, by said computer, said Login-ID as a role owner of said first role;
    receiving, by said computer, a login request from said Login-ID;
    enabling, by said computer, first role owner capabilities for said Login-ID, wherein said first role owner capabilities comprise at least one of defining the role membership of said first role, defining role attributes of said first role, delegating role owner capabilities for said first role;
    assigning, by said computer and in response to a request from said Login-ID, said Login-ID as a role owner of said second role;
    receiving, by said computer and from said Login-ID, a request to deactivate said first role; and
    disabling, by said computer and in response to said request, said first role capabilities for said Login-ID, and wherein said Login-ID remains logged on with said second role, wherein said disabling is effective until at least one of a request is received to enable said first role capabilities and said Login-ID logs off.

2. The method of claim 1, further comprising:
    querying a database for a list of primary attributes of said first role;
    receiving a selection of a first primary attribute;
    associating said first primary attribute with said first role to establish a first characteristic; and
    assigning an initial value to said first primary attribute.

3. The method of claim 2, further comprising validating said first association based upon a predetermined rule.

4. The method of claim 3, further comprising validating said first characteristic based upon a predetermined rule.

5. The method of claim 4, further comprising creating said data structure by:
    creating a role owner class;
    creating a role class;
    creating a Login-ID class;
    creating a active_roles association between said role class and said Login-ID class; and,
    creating a role_owner association between said role class and said role owner class.

6. The method of claim 5, further comprising:
    creating a group class;
    creating a member_of association between said group class and said role class; and,
    creating a group_member_users association between said group class and said role class.

7. The method of claim 6, further comprising:
    creating a role user class; and,
    creating a usable_roles association between said role use class and said role class.

8. The method claim 7, further comprising identifying a second Login-ID when said requestor does not have permission to assign said Login-ID as role owner.

9. The method of claim 8, further comprising, when said validating step is negative, sending a list of violated rules to said requestor.

10. The method of claim 9, further comprising, when said validating step is negative, receiving a modified association.

11. The method of claim 10, further comprising, when said validating step is negative, receiving a modified association from said requestor.

12. The method of claim 11, further comprising selecting a second primary attribute, and associating said second primary attribute with said first role.

13. The method of claim 12, further comprising querying said database for a list of non-primary attributes of said first role, selecting a first non-primary attribute, assigning said first non-primary attribute to said first role.

14. The method of claim 13, further comprising defining custom attributes.

15. The method of claim 14, further comprising defining custom attributes which include custom primary attributes and custom non primary attributes.

16. The method of claim 15, further comprising modifying said first primary attribute.

17. The method of claim 16, further comprising:
receiving a request, from a requestor, to modify said first primary attribute;
determining that said requestor has permission to modify said first primary attribute;
validating said modified first primary attribute; and
modifying said first primary attribute to create a modified first primary attribute.

18. The method of claim 17, wherein said determining step further comprises:
receiving a request to evaluate requestor attribute;
determining active roles for said requestor;
determining proper order to process said active roles;
analyzing each of said active roles to obtain an evaluation of said requestor attribute; and,
ending said evaluation to said requestor.

19. The method of claim 18, wherein said analyzing comprises applying a binary operator to a first attribute and a second requestor attribute, and updating said evaluation.

20. A role-based system comprising:
a network interface communicating with a non-transistor memory;
said memory communicating with a processor for implementing said role-based system; and
said processor, when executing a computer program, performs operations comprising:
creating, by said processor, a Login-ID within a data structure;
creating, by said processor, a first role and a second role within said data structure;
receiving, by said processor and from a requestor, a request to assign said first role to said Login-ID;
assigning, by said processor, said Login-ID as a role owner of said first role;
receiving, by said processor, a login request from said Login-ID;
enabling, by said processor, first role owner capabilities for said Login-ID, wherein said first role owner capabilities comprise at least one of defining the role membership of said first role, defining role attributes of said first role, delegating role owner capabilities for said first role;
assigning, by said processor and in response to a request from said Login-ID, said Login-ID as a role owner of said second role;
receiving, by said processor and from said Login-ID, a request to deactivate said first role; and
disabling, by said processor and in response to said request, said first role capabilities for said Login-ID, and wherein said Login-ID remains logged on with said second role, wherein said disabling is effective until at least one of a request is received to enable said first role capabilities and said Login-ID logs off.

21. A non-transitory computer-readable storage medium having computer-executable instructions stored thereon that, if executed by a computer for implementing a role-based system, causes said computer to perform operations comprising:
creating, by said computer, a Login-ID within a data structure;
creating, by said computer, a first role and a second role within said data structure;
receiving, by said computer and from a requestor, a request to assign said first role to said Login-ID;
assigning, by said computer, said Login-ID as a role owner of said first role;
receiving, by said computer, a login request from said Login-ID;
enabling, by said computer, first role owner capabilities for said Login-ID, wherein said first role owner capabilities comprise at least one of defining the role membership of said first role, defining role attributes of said first role, delegating role owner capabilities for said first role;
assigning, by said computer and in response to a request from said Login-ID, said Login-ID as a role owner of said second role;
receiving, by said computer and from said Login-ID, a request to deactivate said first role; and
disabling, by said computer and in response to said request, said first role capabilities for said Login-ID, and wherein said Login-ID remains logged on with said second role, wherein said disabling is effective until at least one of a request is received to enable said first role capabilities and said Login-ID logs off.

22. The method of claim 19, further comprising:
receiving a request from an application to determine a permission for said Login-ID;
determining that said Login-ID is a member of said first role and a third role;
determining that said permission is associated with a first attribute of said first role ("attribute 1-1") and a first attribute of said third role ("attribute 3-1");
determining a composite attribute value based upon an attribute 1-1 value and an attribute 3-1 value; and
evaluating said permission based upon said composite attribute value.

23. The method of claim 22, wherein said determining said composite attribute value comprises applying a Boolean operation to said attribute 1-1 value and said attribute 3-1 value.

* * * * *